US006832295B1

(12) United States Patent
Stonecypher

(10) Patent No.: US 6,832,295 B1
(45) Date of Patent: Dec. 14, 2004

(54) METHODS AND SYSTEMS FOR EXTENDING AN APPLICATION'S ADDRESS SPACE

(75) Inventor: Thomas E. Stonecypher, West Columbia, SC (US)

(73) Assignee: NCR Corporation ( * ) Notice: Subject to any disclaimer, the term of this patent is extended or adjusted under 35 U.S.C. 154(b) by 550 days.

(21) Appl. No.: 09/837,952

(22) Filed: Apr. 19, 2001

Related U.S. Application Data

(60) Provisional application No. 60/199,885, filed on Apr. 26, 2000.

(51) Int. Cl.$^7$ .............................................. G06F 12/08
(52) U.S. Cl. ...................... 711/135; 711/118; 711/133; 711/136; 711/141; 711/142; 711/143
(58) Field of Search ........................... 711/2, 118, 133, 711/135, 136, 141, 142, 143

(56) References Cited

U.S. PATENT DOCUMENTS

| 5,493,663 | A | | 2/1996 | Parikh ........................ 711/159 |
|---|---|---|---|---|
| 5,721,858 | A | | 2/1998 | White et al. ................. 711/203 |
| 5,787,476 | A | | 7/1998 | Laudon et al. .............. 711/141 |
| 5,835,964 | A | | 11/1998 | Draves et al. .............. 711/207 |
| 5,838,893 | A | | 11/1998 | Douceur ........................ 714/7 |
| 5,860,141 | A | * | 1/1999 | Washington et al. ........ 711/202 |
| 5,860,144 | A | | 1/1999 | Frank et al. ................. 711/206 |
| 5,893,155 | A | * | 4/1999 | Cheriton ..................... 711/144 |
| 5,893,166 | A | | 4/1999 | Frank et al. ................. 711/163 |
| 5,895,499 | A | | 4/1999 | Chu ........................... 711/202 |
| 6,115,795 | A | * | 9/2000 | Gilda et al. ................. 711/141 |
| 6,138,216 | A | * | 10/2000 | Harvey ........................ 711/139 |
| 6,192,487 | B1 | | 2/2001 | Douceur ........................ 714/8 |

* cited by examiner

*Primary Examiner*—T Nguyen
(74) *Attorney, Agent, or Firm*—Schwegman Lundberg Woessner Kluth

(57) ABSTRACT

Methods and systems for efficiently managing an application's address space are provided. An application requests physical memory beyond what is permissibly provided by the operating system. The application's virtual memory addresses are efficiently managed so that when access to a memory buffer is desired by the application, the logic required to map the buffer into the application's address space has been substantially completed prior to the application's request. Additionally, a method and system efficiently flushes, in advance of a need by an application, a virtual memory address from the virtual-to-physical memory caches (e.g., TLBs) of multiple processors on which the application is running.

24 Claims, 9 Drawing Sheets

US 6,832,295 B1

METHODS AND SYSTEMS FOR EXTENDING AN APPLICATION'S ADDRESS SPACE

This application claims priority from U.S. Provisional 60/199,885 filed Apr. 26, 2000, the disclosure of which is incorporated herein by reference.

FIELD OF THE INVENTION

The present invention relates to methods and systems for managing virtual memory remapping. More particularly, the invention is directed to efficient methods and systems for managing the extension of an applications's address space by remapping virtual memory. The invention also relates to methods and systems for flushing memory caches in a multi-processor environment.

BACKGROUND OF THE INVENTION

Virtual memory management techniques are well known in the art. Memory is primarily made up of fast local memory (e.g., Random Access Memory "RAM") and slower external memory (e.g., magnetic or optical disks). Local memory may be further divided into very high speed memory, usually embodied in small cache memory, and somewhat slower main memory. The available size of external memory is limited only by the capacities of the disks present on the system, while the size of local memory is limited by the addressing capabilities of the processor.

Modern processor architectures typically provide virtual memory functionality. Virtual memory gives an application the illusion of having a very large, linear address space, significantly reducing the complexity of application memory management. At the same time, the operation system, which has the responsibility for managing virtual memory mappings, has the discretion to remove memory from the application's address space when it determines that the memory may be better used elsewhere in the system. The combination of ease of use for application programming and flexibility in resource allocation in the operating system has proven to be powerful, leading to the popular adoption of virtual memory systems.

A virtual memory manager in an operating system determines what virtual memory is mapped to physical memory and what virtual memory will be unmapped from the faster physical memory and stored in slower external memory.

The operating system initializes the memory management data structures which will be used by the processor and operating system to translate virtual addresses into corresponding physical or external addresses. A virtual memory address is typically converted into a physical memory address by taking the high order bits of the virtual memory address and deriving the virtual page number. To determine the physical page which maps a virtual page, the virtual page number is indexed into a table (often called the pagetable), which specifies, among other things, the physical page number mapped by that virtual page mapping. The physical page number is then concatenated with the low order bits of the virtual memory address—the byte offset within the page—to produce the complete address in physical memory corresponding to the original virtual address. The processor performs this virtual-to-physical address translation process during program execution. The operating system manages the pagetable, modifying it as appropriate, to indicate to the processor which virtual pages map to which physical pages. The processor will then reference the physical memory addresses thus produced, to reference program code or data.

Typical 32-bit processors have 32-bit physical addressing capabilities. This implies that such a 32-bit processor may address up to 232 bytes of physical memory, or 4 GB. Similarly, 32-bit processors typically support 32-bit virtual addressing, yielding 4 GB virtual address spaces. Operating systems supporting virtual memory typically reserve between ¼ and ½ of the total virtual address space provided by any given processor architecture, for storage of system-wide operating system data, such as device data structures and the file system cache. The remainder of the virtual address space may be used for application virtual memory. For a typical 32-bit processor with 32-bit virtual address, an application thus has access to roughly 2 to 3 GB of virtual address space for application use —including buffer space, application code, heap space, stack space, per-process control data, and the like.

Server applications such as database servers or mail servers typically require large virtual address spaces to support high throughput rates with large numbers of connected clients. These address spaces may contain caches of user data buffers, allowing the application to increase throughput by performing operations in main memory rather than performing slower external disk I/O, thereby increasing throughput. Once these applications have fully utilized the 2 to 3 GB of application virtual address space, further gains in throughput will ordinarily be impossible, since additional memory must be stored on disk rather than in main memory. However, depending on operating system activity, physical memory may be available in abundance—that is, there may be significant amounts of physical memory in the system which is not mapped into any address space, or is lightly used, and thus is available for use elsewhere.

But, since the application's address space is fully consumed, there is no place in which to effectively use the memory to benefit the server application. The net effect is that application throughput is bottlenecked due to lack of accessible application memory space. A mechanism that provides a means for an application that has exhausted its virtual address space to allocate and access a large additional tier of main memory, even if such access is somewhat more expensive than standard application-mapped virtual memory, is therefore needed.

Computations associated with translating a virtual address into a physical address, internal to the processor's execution engine, can be expensive, due to the multiple memory references involved and the associated logical manipulations. To reduce this overhead, processors usually have translation look-aside buffers ("TLBs"). TLBs are small caches made of fast, associative memory, internal to the processor. TLBs maintain a list of the most recently used virtual memory addresses along with their corresponding physical memory addresses. When the operating system changes the mapping of a virtual page by modifying the pagetable which stores the virtual-to-physical memory address translation data, the operating system must notify the processor(s) to flush the old virtual-to-physical memory mapping, if it exists, from the TLB.

If the physical memory address mapped to a virtual memory address is modified without the TLB being flushed, then an incorrect or invalid memory location may be accessed by an application, potentially resulting in data corruption or application failure. It is, therefore, critical that the operating system's virtual memory manager flush stale TLB entries with certainty, to protect data integrity.

In a multi-processor ("MP") computer system, not just the TLBs in the local processor must be updated when a virtual-to-physical mapping changes. In fact, all processors that are executing code in the subject address space (referencing in any way the soon-to-be modified pagetable) must have their local TLBs flushed. One standard technique of effecting this update operation is to send an interprocessor interrupt to each affected processor in the system. During the period of time the target processor(s) are handling the interrupt, other, lower priority processor activities are blocked, for a period of numerous processor cycles, while the target processor saves its state, further dispatches the interrupt, flushes its TLB, acknowledges that the TLB has been flushed, restores its pre-interrupt state, then continues with its previous work.

Meanwhile the processor that initiated the change to the virtual memory mapping performs a busy-wait operation (not doing any application work), waiting for the other processors that must flush their TLB, to acknowledge that the TLB flush operation is complete. The entire TLB flush operation, counting all the cycles on all processors involved and the bus cycles involved in communicating between processors, can be very expensive. A TLB flush operation is overhead, since the application makes no forward progress for the duration of the operation. An efficient method to update all processors' TLB entries in a multi-processing environment, whether in the context of extending application memory space or not, is therefore highly desirable.

Furthermore, prior attempts have made additional physical memory available to an application beyond what the operating system would normally permit. For example, Washington, et al. U.S. Pat. No. 5,860,141 ("Washington") assigned to the NCR Corporation creates an interface between an application and the operating system to permit the application to gain access to more address space than the application might otherwise be allotted by the operating system.

This is done by utilizing some of the physical memory which would normally not be within the addressable address space of the application to create a larger pool of memory buffers. Some of these buffers are directly accessible by the application and some must be remapped into application address space prior to use. These physical memory buffers are then managed by recycling the list of available virtual memory addresses in an exact least-recently-used order ("LRU"), when these virtual memory addresses are not in use by the application, and associating these virtual memory addresses with different physical memory buffers. However, using exact LRU to maintain the list of available virtual memory addresses to associate with new physical memory buffers creates performance bottlenecks in memory-intensive applications.

Washington maintains exact buffer LRU ordering by utilizing a linked list, which results in significant interprocessor coherence memory traffic as buffer headers must be linked to the head of the list whenever their reference count goes to zero, and unlinked from the list whenever they are needed by the application. Washington flushes processor TLB entries across all processors in an MP system at the time a buffer transitions from extended to mapped state, i.e. on demand.

The Washington TLB flush operation is carried out by invoking a driver routine, effecting a transition to kernel-mode, which then flushes the appropriate virtual addresses from the local processor's TLB, and further requests interprocessor interrupts to invoke driver methods on other processors. Meanwhile, the issuing processor of the TLB flush operation idles itself until all driver routines indicate that the TLB flush operation is complete. This operation is expensive, involving a kernel-mode trap, multiple interrupts on multiple processors, numerous bus cycles (probably the heaviest expense since in a MP system running a server application at maximum throughput, the interprocessor or memory bus is typically the bottleneck), and significant end-to-end latency. The overhead of this operation significantly reduces application throughput.

It is apparent that a method and system that more efficiently provides a large additional tier of virtual memory to an application is needed to improve the operating performance of memory-intensive server applications. Furthermore, it is apparent that a method of efficiently flushing processor TLBs is needed to effect memory management operations with minimal overhead.

SUMMARY OF THE INVENTION

Accordingly, it is one object of the present invention to provide methods and systems for decreasing the overhead associated with providing an application very large memory (i.e., a memory beyond the normal operating system assigned application memory). Furthermore, it another object of the present invention to efficiently flush the TLBs associated with MP computing environments. This is achieved by reducing unnecessary interrupts of remote processors, thereby increasing application processing throughput.

An application, using conventional means, allocates a number ("M") of ordinary, mapped memory buffers that are directly accessible to the application. The application also requests from a user library a number ("N") of extended memory buffers, which are maintained in physical memory (e.g., RAM), but not directly accessible to the application. Thereafter, the application initializes all its data structures as though it had access to M+N memory buffers.

The state of the memory buffers (e.g., mapped, extended, or transitional) is abstracted and removed from the application's programming logic. The application merely issues a call to the user library prior to using a memory reference and the user library ensures the buffer is in state permitting a reference by the application. After referencing the buffer, the application issues a call to the user library indicating that references to the buffer has ended, whereupon the user library frees the buffer for reuse. Multiple concurrent references may occur with the user library managing the reference counts of the buffer and the states of the buffer as appropriate.

Moreover, a flushing flag uniquely identifying each processor is maintained, such that the TLBs associated with each processor in an MP environment is optimally flushed when driver context is established on any processor. In this way, multiple interrupts and latency are avoided, and thus overhead is reduced.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects and in accordance with the purpose of the present invention, methods and systems are provided for determining in advance of a request, from an application, those virtual memory addresses available for use, and for the efficient flushing of the TLBs (virtual-to-physical memory caches) associated with those available addresses on the processors in a multi-processor environment in advance.

One aspect of the present invention provides a method of granting additional memory located outside the addressable region of a process having executable instructions, comprising receiving a memory accessible through a plurality of out-of-process addressable addresses and a plurality of in-process addressable addresses. Further, a process is received which is capable of accessing the memory of a number of the out-of-process addressable addresses through a remapping of a number of the in-process addressable addresses. Additionally, a plurality of available in-process addressable addresses are created in advance of a request from the process.

Another aspect of the present invention provides a method for flushing a memory cache associated with virtual memory mapping in a multi-processing environment having executable instructions, comprising a memory accessible to a plurality of processors and a process. Moreover, the processors are permitted to run on a network and each processor has a virtual-to-physical memory cache including a plurality of virtual memory addresses mapped to a plurality of physical memory addresses. Further, the process runs on the processors and has a number of virtual memory addresses to access the physical memory addresses of the memory, and the process is interfaced with the virtual-to-physical memory cache for each of the processors. Also, when the driver has a context on one of the processors, the virtual-to-physical memory cache located on the processor in context is flushed, as appropriate.

In yet another aspect of the present invention, a system is provided for providing additional memory located outside the addressable region of a process and for flushing memory cache, comprising a memory accessed through a plurality of out-of-process addressable addresses and a plurality of in-process addressable addresses. Further, a plurality of processors are provided wherein each processor has a virtual-to-physical memory cache. Also, a process is provided having access to the memory through the in-process addressable addresses.

A remap set of executable instructions is operable to remap the in-process virtual addresses of the process to gain access to the memory associated with the out-of-process addresses. Finally, a flushing set of executable instructions flushes a number of the in-process addressable addresses and a number of the out-of-process addressable addresses on a number of the virtual-to-physical memory caches of the processors while the driver has a context on one of the processors.

Also, a system for providing additional memory located outside the addressable region of a process and for flushing memory cache is provided, comprising a memory accessible through a plurality of out-of-process addressable addresses and a plurality of in-process addressable address and a plurality of processors, each having virtual-to-physical memory cache. A remap set of executable instructions remaps the in-process addressable addresses of the process in order to gain access to the memory associated with the out-of-process addressable addresses. Further, a flushing set of executable instructions flushes the caches when the driver has a context one of the processors, as appropriate.

Still other objects of the present invention will become apparent to those skilled in this art from the following description wherein there are shown and described exemplary embodiments of this invention, simply for purposes of illustration. As will be realized, the invention may take on other aspects and arrangements than those described in detail below without departing from scope of the invention, as defined by the claims.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to various exemplary embodiments of the present invention, examples of which are illustrated in the accompanying drawings, wherein like numerals indicate the same elements throughout the views.

DETAILED DESCRIPTION

Figure 1:
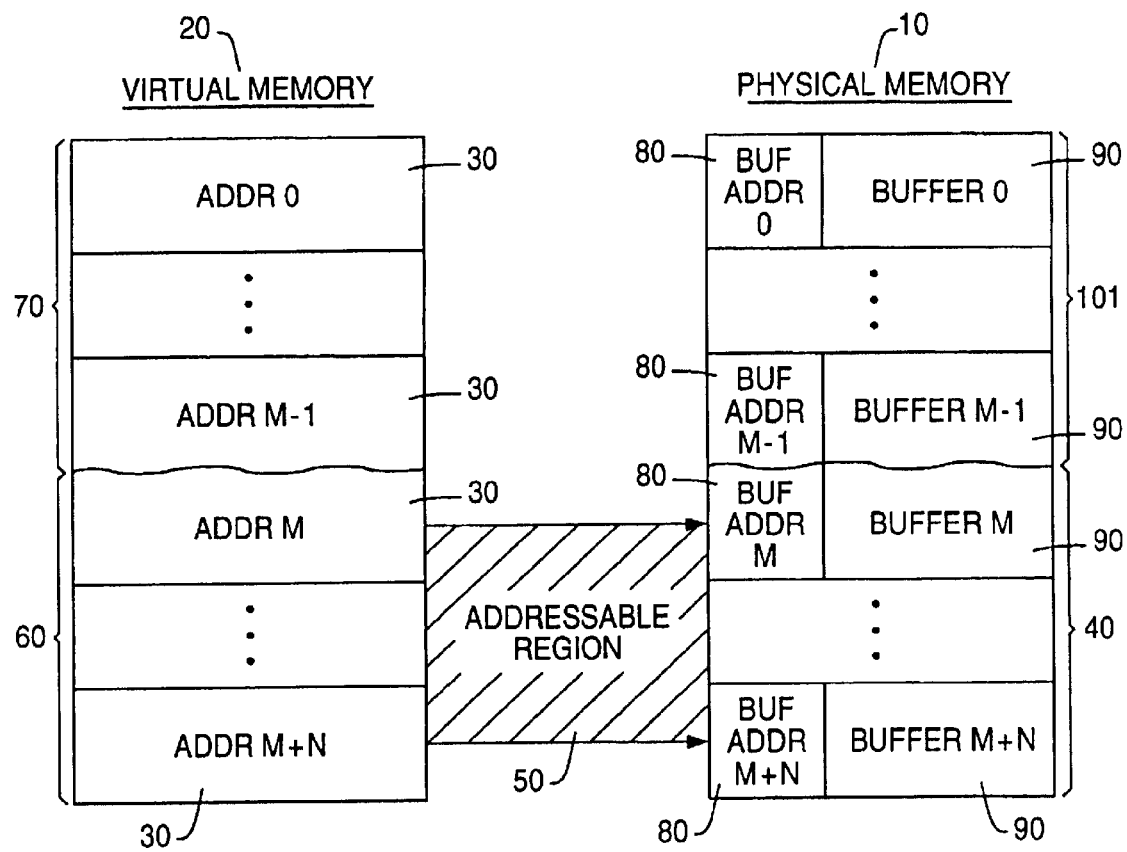
FIG. 1 is a diagram illustrating a virtual memory to physical memory mapping.

The invention will be specifically disclosed in connection with the MICROSOFT Windows NT operating system as implemented in C programming language and as used in a MICROSOFT mail server application. The network and the processors of the specifically disclosed exemplary embodiment support a symmetric multi-processing environment. Although as one skilled in the art will readily appreciate, any operating system, programming language, application, and MP environment may, now known or hereafter developed, may be used to perform the tenets of the present invention.

An Application Programming Interface ("API") is available as a lower level set of executable instructions provided as a user's library, which may be used by higher-level processes. The user library manages the allocation of memory buffers such that the physical memory is accessed by addresses which are addressable by an application ("in-process addressable addresses") and by addresses which are not addressable by the application ("out-of-process addressable addresses"). The details of the user's library are transparent to the application.

A process, as used herein, is a set of executable instructions capable of running on a processor. This includes by way of example only, an application, an operating system, a user library module, a driver, a function, a routine, and the like. Further, the user library provides the calling process the capability of accessing physical memory outside of the calling process's addressable region by creating in advance of a request from the calling process a plurality of available addresses which are in the calling process's addressable region, but which have been prepared to be remapped to be associated with memory outside the addressable region of the calling process.

A higher level calling process cannot directly access out-of-process addresses associated with physical memory not mapped to the calling process's address space. However, the memory is made accessible to the calling process on demand when required by the calling process. As one skilled in the art will readily appreciate, the techniques for inexpensively managing and realizing access to out-of-process addresses on demand in order to extend a calling process' buffer space are significant improvements over what has been done in the past.

Initially, a calling process receives a set of mapped addresses on initialization (the ordinary, mapped memory buffers). The calling process then requests additional physical memory (the extended memory buffers) from a user library process and specifying as arguments the address of the mapped memory buffer, the number of mapped buffers, M, the size of each buffer, and the requested number of extended buffers, N. The user library then communicates with a driver that interacts with the operating system to acquire the physical memory necessary to populate the extended memory buffers. The driver initializes any data structures required to store the extended memory, such as and by way of example only, a one-dimensional array of extended buffers and any other data structures needed to manage the extended buffers. The driver then returns control to the user library.

The user library then allocates a set of buffer headers, one for each buffer (both mapped and extended buffers, initially there are no transition buffers at this stage) out of contiguous calling process virtual memory (in-process addressable addresses). The buffer headers store attributes associated with each buffer. The user library owns and manages a buffer header array, transparent to the calling process. Each buffer header includes state information: the buffer state (e.g., mapped, extended, or transition), the reference count of the buffer (e.g., buffer is in a mapped state), the virtual address of the buffer (e.g., buffer is in a mapped state), the index of the buffer in extended memory (e.g., buffer is in an extended state), the processors which have performed the TLB flush on the buffer (e.g., buffer is in a transition state), reference bit(s) used by a global clock algorithm and the like. The buffer headers may be allocated and accessed as a one-dimensional array of buffer headers; typically header[x] corresponds with buffer[x], where buffers which were initially in the mapped state occupy positions 0:(M−1) and buffers which were initially in the extended state occupy positions M:(M+N−1).

The calling process starts a buffer reference's lifetime by calling the user library prior to attempting a reference to the buffer. The buffer requested by the calling process may be in one of three states: mapped, extended, or transition. Buffer states are opaque to the calling process; in no case does the calling process know the buffer state, except that a buffer is guaranteed to be in the mapped state from the time the user library indicates that the calling process may access the buffer following a calling process calls the user library indicating that the buffer is no longer in use. The control flow of user library differs according to the state —mapped, extended, or transition of the requested buffer. Each case will be considered in turn.

Buffers that are in the mapped state are directly accessible by the calling process with only minimal work from the user library. Since frequently accessed buffers are maintained in mapped memory, the initial invocation of the user library is by far the most common case. The object of the user library when invoked on a mapped buffer is to update the state of the buffer with as little overhead as possible and return to the calling process, signifying that access to the buffer is now possible. The user library first locks the buffer header, acquiring exclusive access to the buffer header. It then increments the reference count stored in the buffer header, updating the number of concurrent reference cycles against the buffer. Then it is determined if the global clock reference bit (in the buffer header) must be updated. The clock hand must be updated if the buffer header is surrounded by the leading and following clock hands (see below for discussion of clock hands). If this condition is not true, the buffer is not in the range of buffers being evaluated to become a transition buffer, so the reference bit is not modified, to reduce unnecessary interprocessor cache coherence traffic.

Otherwise, if the buffer header is surrounded by leading and following clock hands, the reference bit is set, to indicate that this buffer has been accessed during this clock sweep. Buffer headers with reference bits set denote buffers that are in more frequent use, thus not qualified candidates to become transition buffers. Finally, the buffer header lock is released and the user library returns the virtual address, which the calling process should use to reference the buffer.

Buffers which are in extended space are not directly accessible by the calling process until mapped into the calling process's addressable virtual address space. The calling process calls the user library on the extended buffer at the beginning of the buffer reference's lifetime. The user library locks the buffer header, increments the buffer's reference count (which was previously zero, otherwise it could not be in extended space) and sets the global clock reference bit if required (e.g., the buffer header is surrounded by the leading and following clock hands, as in the mapped case above). The user library then selects a buffer which is in the transition state, meaning that it is mapped into the calling process's addressable address space and has had, or is having, its virtual address flushed from TLBs on all processors in the MP environment.

The user library will preferentially select a buffer which has already had its virtual address flushed from TLBs on all processors in the system. The selected buffer may be termed the victim buffer. The victim buffer will be flipped out to extended space, trading its position in mapped space (its virtual address slot) with the buffer that the calling process is requesting. In turn, the victim buffer will occupy the slot in extended space formerly occupied by the buffer the calling process is requesting. The user library then issues a remap request to the driver. This request contains information indicating the virtual address of the victim buffer, the extended space index of the requested buffer, and optionally specifies that a TLB flush operation must be performed, specifying a mask indicating which processors require the TLB flush operation and the address(es) to be flushed.

The driver will remap the page table entry corresponding to the victim page to point to the requested page, and will change the extended space array to store the victim buffer's physical page number in place of the requested buffer's page number. Ordinarily, the victim buffer would have already been flushed on all required processors (see herein below), but in the event of asymmetrical calling process execution it may prove necessary for the driver to perform the TLB flush operation on demand on one or several processors.

The driver request to perform the remap operation is executed on a certain processor in the system (e.g., the processor on which the calling process's executable instructions which requested access to the buffer in extended space are executing). While executing the remap request on this processor, or during any other driver request, the driver checks a list of in-progress transition buffers (this list does not include the victim buffer associated with the remap request). If any of the in-progress transition buffers require a TLB flush operation on the current processor, this processor performs that operation then sets a bit in the transition buffer's buffer header indicating that the TLB flush operation has been performed on this processor. As one skilled in the art will readily appreciate, by so doing, the driver and user library cooperate to pre-flush candidate buffers across all processors with very minimal overhead.

Another way to view this is that the driver piggybacks TLB flush operations onto other work requests (e.g., remap requests). Since the calling process's execution is typically designed to be symmetrical across processors and since the user library arranges to have a sufficiently long list of transition buffers to mask any temporal asymmetry, inter-processor interrupts for TLB flushing are thus avoided. Inter-processor interrupts are expensive operations, in terms of bus cycles, processor cycles and request latency. The transition list thus provides another object of the present invention which is the efficient flushing of virtual memory addresses from the TLB caches of the processors in a MP environment. The transition list uniquely provides this functionality by establishing data structures which allow the efficient piggybacking the TLB flush operation onto other driver requests, and the maintenance of TLB flush state per buffer header.

On completing the remap operation, the driver returns to the user library. The user library then unlocks the buffer header and returns the virtual address, now mapped to the requested buffer (previously the virtual address associated with the victim buffer) to the calling process.

Buffers in the transition state are directly accessible to the calling process, but the user library must clean up some buffer header states to return the buffer to the mapped state. In the case that the calling process requests a transition buffer, the user library locks the buffer header, increments the reference count (as in both other cases) and removes the buffer from the list of transition buffers. If the buffer has been invalidated (see below), the user library issues a driver request to have the buffer validated. The buffer header is then unlocked and the virtual address of the buffer returned to the calling process.

On some microprocessors, it may be necessary to temporarily invalidate page table entries associated with transition buffers at the time the buffers are placed on the transition list. This is because speculative instruction execution, which may, depending on processor architecture, fill the processor's TLB, may not be controllable with any step short of marking the page table entry invalid. The invalidation of the page table entry may be performed by the first processor that performs the TLB flush operation on the new transition buffer.

In the foregoing discussion, an implied assumption has been that buffer size equals page size. As one skilled in the art will readily appreciate, this abstraction has been applied in order to simplify the explanation of the techniques. However, the techniques detailed herein apply equally well with any constant buffer size which is a power of two. If the buffer size is less than the processor's page size, the entity that the buffer header refers to (e.g., the managed entity) is a single processor page. Multiple buffers within a single page map to a single buffer header. When any buffer in the page is required by the calling process, the page is placed in the mapped state, thus all the buffers in the page inherit the mapped state. Similarly, when all the buffers in a page have been sufficiently idle, the page may migrate to the transition state and eventually to the extended state.

Moreover, if the constant, power-of-two buffer size is a multiple of the processor page size, each buffer header refers to multiple physical pages, then the pages change states as an atomic group, according to the calling process' request behavior.

Furthermore, the transition list contains a list of buffers that are in the transition state. Periodically, valid mapped buffers are moved from mapped state to transition state (i.e., thus placed on the transition list) by the user library. Since buffers in the transition list will likely be migrated to extended space on behalf of remap operations, it is important that buffers which have not been recently used be selected as candidates for the transition list. When a map function of the user library executes, it will, if the requested buffer is in extended space, utilize the virtual address associated with a transition buffer to map an extended buffer and at that time, the transition buffer becomes an extended buffer.

When this activity completes, the transition list contains one fewer transition buffer, with the victim buffer now being in extended space. The map routine then compares the size of the transition buffer list to a low-water mark value. If the list size is at or below the low-water value, the map routine invokes another user library routine whose function is to invoke the global clock buffer reference scheme to find relatively unused buffers in order to populate the transition list, up to a high-water mark value. As one skilled in the art will appreciate, the water mark values are predetermined numbers identifying an optimal number of memory buffers which are available as in-process addressable addresses. The water mark values are configurable so as to achieve optimal performance.

The map routine maintains two clock hands, each of which points to a buffer header. The distance between the clock hands is fixed at initialization time, but is a configurable parameter, greater distance results in better approximation to LRU, but also somewhat higher overhead.

As will be apparent to one skilled in the art, the global clock algorithm utilized may be functionally similar to that used by many operating system memory managers. The global clock routine updates the two clock hands in lock step, maintaining a static distance between the hands at all times. Each time the leading hand is advanced by one buffer header, the reference bit in that header is cleared. Immediately after this, the following hand is advanced by one header. The reference bit in the header thus pointed to by the following hand is then evaluated. If it is clear, indicating that no reference has occurred since the time the leading hand touched that header, and the buffer has a zero reference count, that buffer header is locked and the conditions retested and if the reference count is still zero, it becomes a transition buffer. Its buffer header is placed on the transition list for subsequent TLB flushing and optional pagetable entry invalidation. At any time if either hand is advanced past the end of the array, it starts over at the header with index zero (e.g., the beginning of the array).

Furthermore, as one skilled in the art will readily appreciate, using a good approximation of LRU algorithm, as discussed above, is extremely advantageous and it comes without the high cost of maintaining exact LRU. Exact LRU requires a linked list be maintained, where the head of the linked list must be read and written numerous times, every time a buffer's reference count becomes zero or when a buffer transitions from zero reference count to one (i.e. virtually every time a buffer is requested). This results in a high load of memory updates, costing additional processor cycles and resulting in significant additional bus traffic (e.g., cache coherence traffic) in a symmetric multiprocessing system.

Now referring to FIG. 1, which is a diagram illustrating a virtual memory 20 to physical memory 10 mapping. A physical memory 10 is comprised of physical memory buffers 90 and physical memory buffer addresses 80. The physical memory 10 is divided into physical memory buffers 90 which are accessed by out-of-process addressable addresses 100 and in-process addressable addresses 40. FIG. 1 also shows a virtual memory 20 comprised of virtual memory addresses 30. Virtual memory 10 is similarly divided into those virtual memory addresses 30 which are reserved virtual addresses 70 and process assigned addresses 60. The addressable region 50 comprises the range of physical memory buffers 90 which are accessible to a process 30 utilizing the virtual memory 20 and process assigned addresses 60.

Figure 2:
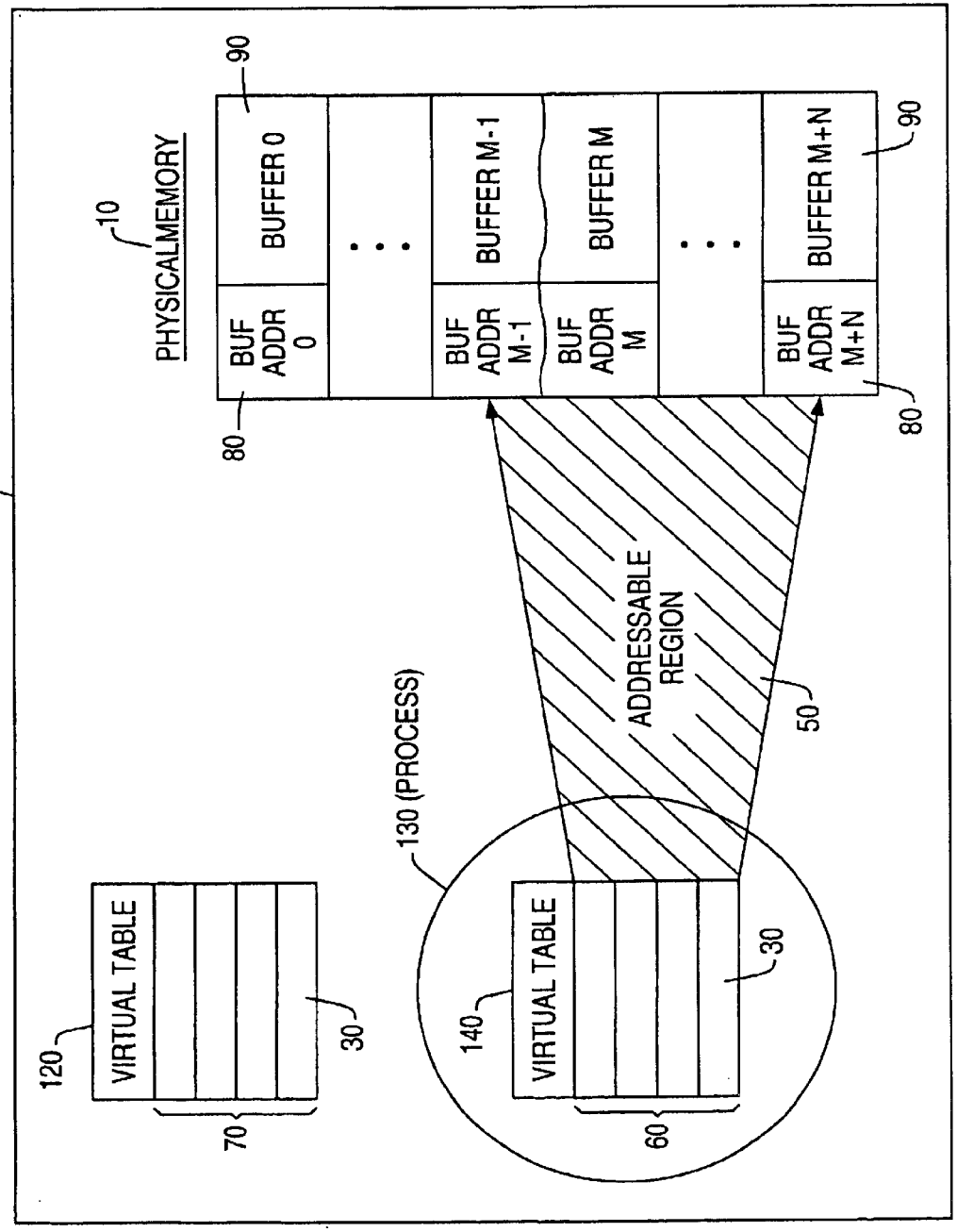
FIG. 2 is a diagram illustrating a process running in an operating system acquiring virtual addresses.

FIG. 2 is a diagram illustrating a process 130.running in an operating system 110 acquiring virtual memory addresses 30 through a process virtual memory table 140 to access a physical memory 10 and its corresponding physical memory buffers 90 by converting the virtual memory address 30 into a physical memory buffer address 80. The range of accessible physical memory buffers 90 is defined as a process's addressable region 50 which may also be referred to as the in-process addressable addresses 40. The reserved virtual addresses 70 are contained in the operating system's virtual memory table 120. The area which cannot be accessed utilizing a virtual memory address 30 contained in the process's virtual memory table 140 is defined as the out-of-process addressable addresses 100.

Figure 3:
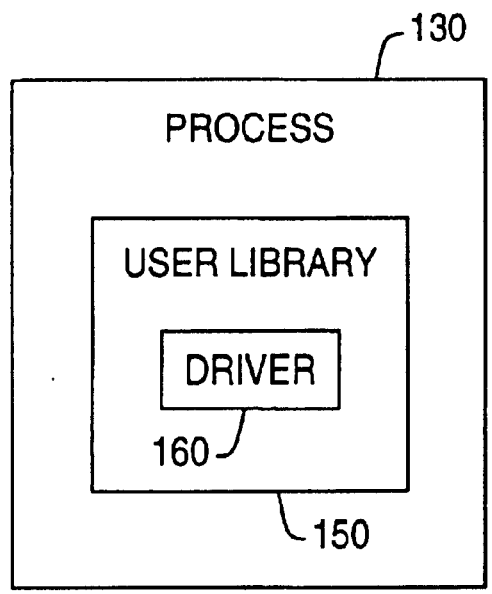
FIG. 3 is a diagram illustrating an architecture of components associated with a process in accordance with the present invention.

FIG. 3 is a diagram illustrating the preferred architecture of components associated with a process 130 in accordance with the present invention. The process 130 comprises a user library module 150 and a driver module 160. The process 130 cannot access the driver module 160 directly rather it must interact through a user library module 150. The driver module 150 is directly accessible to the user library module 150. Further, the driver module 160 is resident in the operating system's 110 kernel so that it is operable to interact with the operating system 110. It would be apparent to one skilled in the art that different architectures are available which do not deviate from the present invention. For example, all the disclosed functionality of the present invention may also be contained within the executable instructions of the operating system 110. In which case, the operating system 110 becomes the process 130. Many other architectural variations are possible as well.

Figure 4:
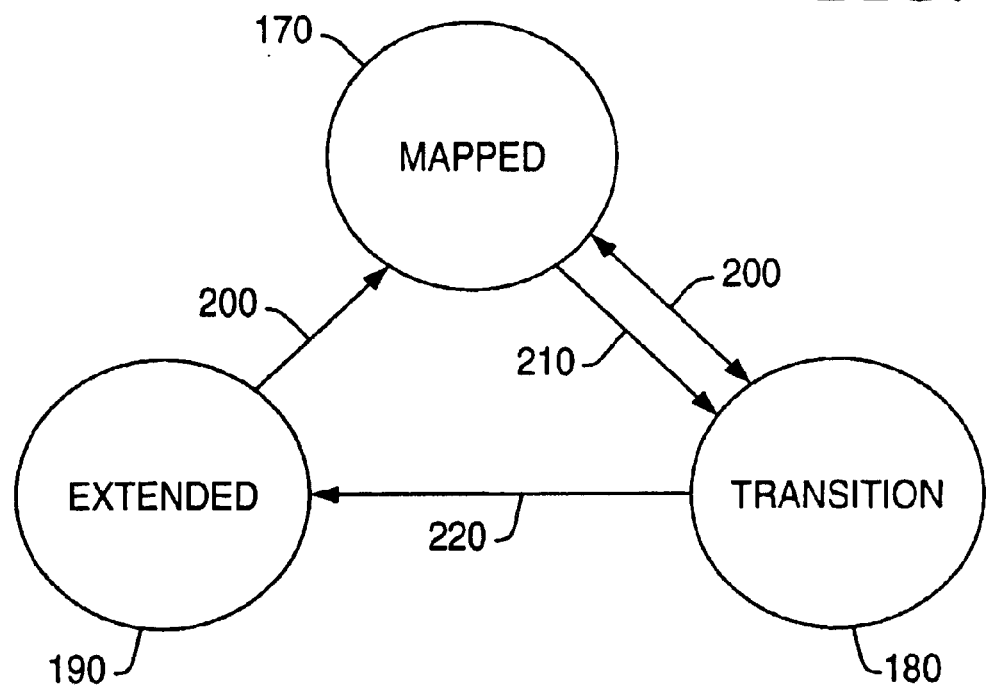
FIG. 4 is a diagram illustrating the state transitions of a buffer in accordance with the present invention.

FIG. 4 is a diagram illustrating the preferred state transitions of a buffer 130 in accordance with the present invention. The mapped state 170 includes those physical memory buffers 90 linked to memory buffer headers 370 which contain in-process addressable addresses 40 and which are in use by the process 130. A process 130 will request a physical memory buffer 90 to be mapped by calling the map routine 200 which resides in the user library module 150. A physical memory buffer 90 may transition from a mapped state 170 to a transition state 180 when selected to transition by the victim selection routine 210 (described herein below).

The extended state 190 includes those physical memory buffers 90 linked to memory buffer headers 370 which contain out-of-process addressable addresses 100 and which are not in use by the process 130. The extended state 190 comprises those physical memory buffers 90 which are available to a process 130 when the process 130 requests a physical memory buffer 90 to be mapped by calling the map routine 200 which resides in the user library module 150. A physical memory buffer 90 transitions from an extended state 190 to a mapped state 170 upon the execution of the map routine 200. The map routine 200 will trigger the execution of a remap routine 220 which will obtain an available in-process addressable address 40 from a physical memory buffer 90 located in the transition state 180.

The transition state 180 includes those physical memory buffers 90 linked to memory buffer headers 370 which contain in-process addressable addresses 40 and which are not in use by the process 130. The transition state 180 comprises those in-process addressable addresses 40 which will either be made directly available to a process 130 for use through a map routine 200 call or will be made available indirectly to the process 130 through a call to the remap routine 220. Physical memory buffers 90 contained in the transition state 180 are continuously populated from physical memory buffers 90 contained in the mapped state 170 but not in use by the process 130.

This is done by the execution of the victim selection routine 210 (described in detail below). Physical memory buffers 90 and in-process addressable addresses 40 are moved from the transition state 180 to the mapped state 170 when a process 130 request through a map routine 200 a physical memory buffer 90 which is currently resident in the transition state 180. Physical memory buffers 90 move to the extended state 190 on the call to the remap routine 220. The remap routine 220 will acquire a physical memory buffer 90 from the transition state 190 and strip from the memory buffer header 370 the valid in-process addressable address 40 which is then associated with physical memory buffer 90 contained in the extended state 190 and further passed along to the process 130 for use after setting the corresponding physical memory buffer 90 and memory buffer header 370 to the mapped state 170. The remaining physical memory buffer 90 originally in the transition state 180 and having a memory buffer header 370 with an in-process addressable address is now set to the extended state 190 and contains a memory buffer header 370 with an out-of-process addressable address 100.

Figure 5:
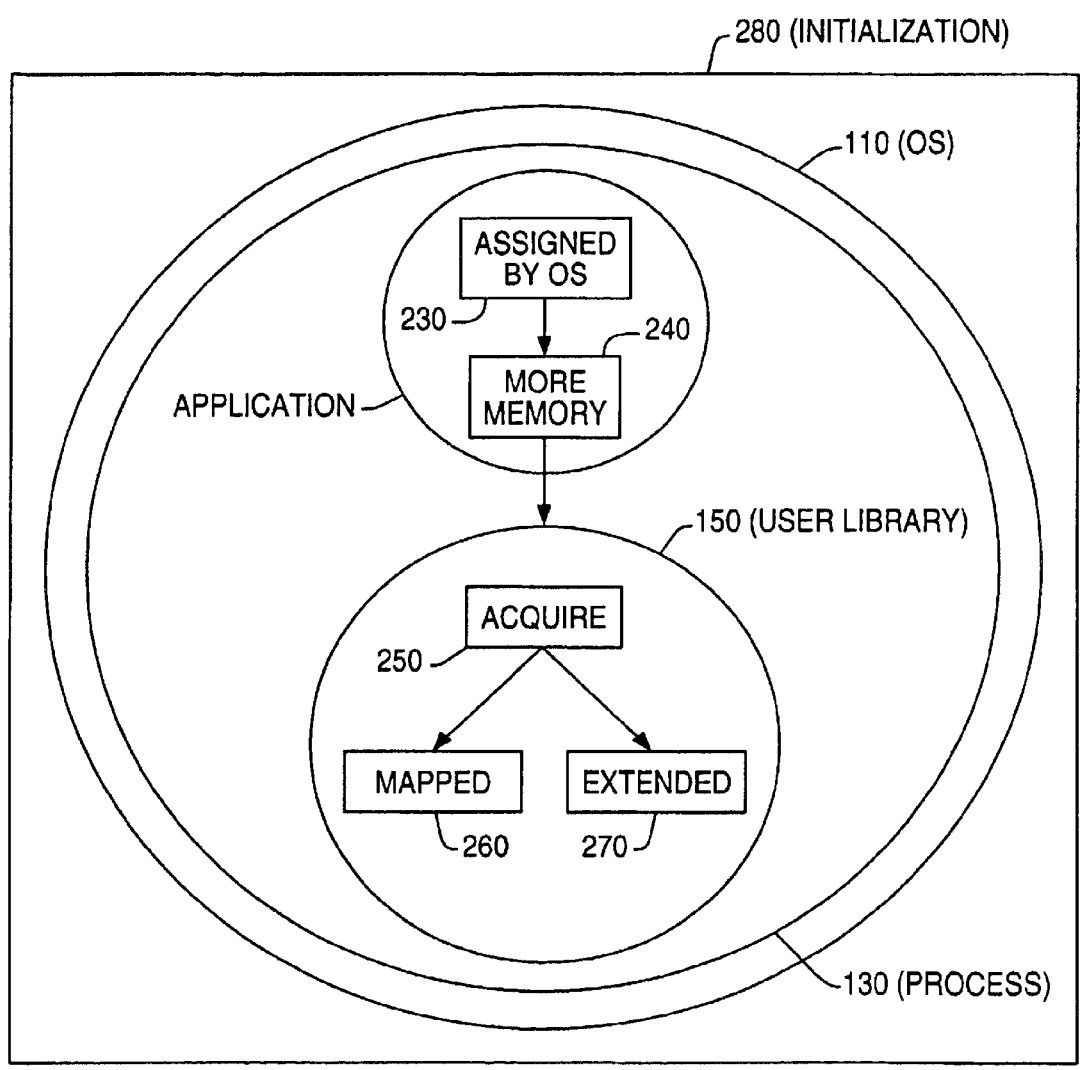
FIG. 5 is a flow diagram illustrating the initialization of a process in accordance with the present invention.

FIG. 5 is a flow diagram illustrating the initialization 280 of a process 130 in accordance with the present invention. Initialization 280 of a process 130 utilizing the present invention initially begins with the process 130 receiving the typical amount of in-process addressable addresses 40 (step 230 of FIG. 5) from the operating system 110 in which the process 130 is executing. The process 130 then makes a call to the user library module 160 requesting more physical memory 10 in step 240 of FIG. 5. The user library module 150 then uses prior techniques to acquire additional physical memory 10 which resides outside the processes addressable region 50, shown in step 250 of FIG. 5. This may be done utilizing the techniques described in Washington.

In Washington, additional physical memory 10 is acquired by dividing physical memory 10 into larger sized buffers, some of these buffers are accessible by in-process addressable addresses 40 and some are accessible by out-of-process addressable addresses 100, but all this is transparent to the process 130 requesting the additional physical memory 10. Once the process 130 requests the additional physical memory 10 by subdividing the physical memory buffers 90 into larger physical memory buffers 90, the user library module 150 creates a data structure preferably a memory buffer header 370 (described in FIG. 8 below). The individual memory buffer headers 370 are then linked together in a composite data structure, preferably a one dimensional memory buffer header array 460.

Figure 6:
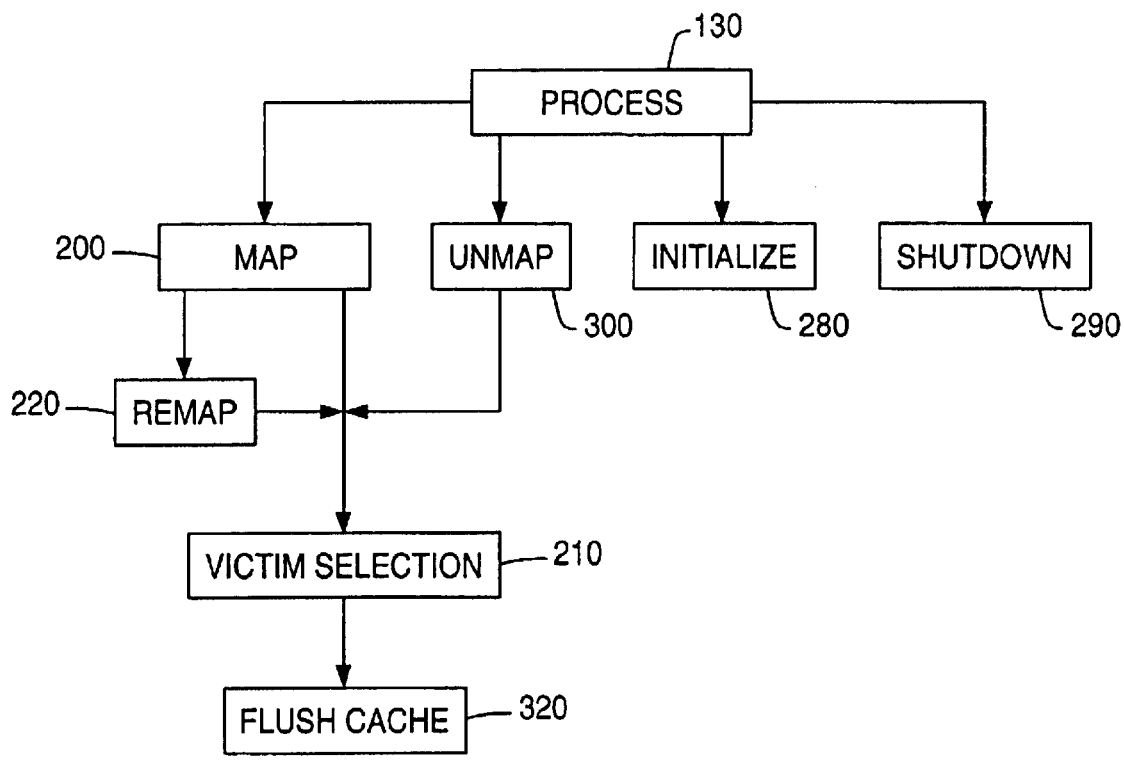
FIG. 6 is a flow diagram illustrating the overall operation of a process in accordance with the present invention.

FIG. 6 is a flow diagram illustrating the overall operation of a process 130 in accordance with the present invention. A process 130 requesting additional physical memory 10 is first initialized in step 280 in accord with the description detailed above for FIG. 5. After initialization 280 the process 130 is free to call the map routine 200 or the unmap routine 300. These routines reside in the user library module 150. The map routine 200 is described with FIG. 11 below; the unmap routine 300 is described in detail with FIG. 10 below; and the remap routine 220 is described in detail with FIG. 12 below.

The map routine 200 makes a call to the remap routine 220 when acquiring a memory buffer header's 370 in-process addressable address 40. The map routine 200, the unmap routine 300, and the remap routine 220 all call the victim selection routine 210 when a transition state's 180 physical memory buffer 90 is acquired. The victim selection routine 210 is described in detail below with FIG. 13. The victim selection routine 210 makes calls to modify the driver table 650 which will then be used by the driver module 160 to flush a processor's 690 virtual-to-physical memory cache 710 in step 320 of FIG. 6. (These operations are described in detail with FIGS. 13 and 15 below.)

Finally, a process 130 terminates normally or abnormally in which case the shutdown routine 250 (described with FIG. 7 below) is executed to free up physical memory 10.

Figure 7:
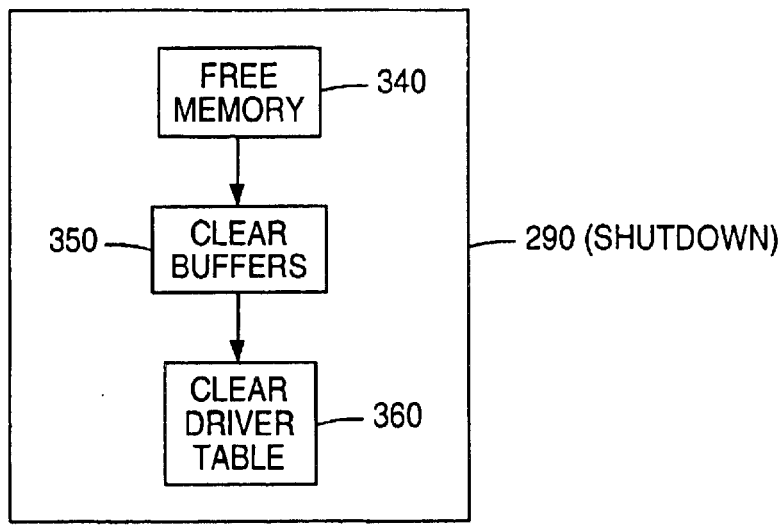
FIG. 7 is a flow diagram illustrating the shut down of a process in accordance with the present invention.

FIG. 7 is a flow diagram illustrating the shut down of a process 130 in accordance with the present invention. The shutdown 290 is achieved by releasing the physical memory 10 which the process 130 acquired at initialization 280 in step 340 of FIG. 7. The memory buffer headers 370 and the memory buffer header array 460 are released in step 350 of FIG. 7. Lastly, the driver table 650 is released and the driver module 160 is terminated.

Figure 8:
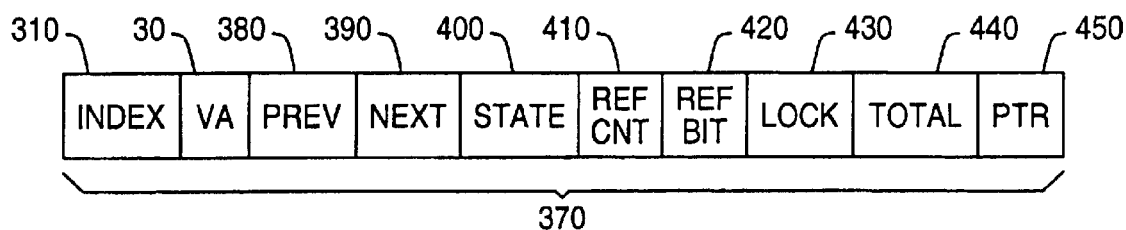
FIG. 8 is a diagram illustrating a data structure in accordance with the present invention.

FIG. 8 is a diagram illustrating a preferred data structure in accordance with the present invention. FIG. 8 is illustrative of a memory buffer header 370. The memory buffer header 370 is preferably a fielded character string. The index 310 field is assigned at initialization 280 and provided to the process 130. The index 310 serves as a direct access handle into the composite data structure, or memory buffer header array 460 described with FIG. 9 below. The index 310 will remain persistent and constant with the physical memory buffer address pointer 450 throughout the life of the process 130. The physical memory buffer address pointer 450 is simply a pointer to the physical memory buffer's address 80. The physical memory buffer 90 referred to herein is accessed seamlessly by the process 130 by providing to the process the physical memory buffer address pointer 450.

The memory buffer header 370 also contains a field for the virtual memory address 30 which corresponds to the physical memory buffer 90 accessed via the physical memory buffer address pointer 450. The state flag 400 is a field used to identify whether a physical memory buffer is in the mapped state 170, the extended state 190, or the transition state 180. The previous index 380 and the next index 390 fields are used to link physical memory buffers 90 residing in the same state into a logical queue within the memory buffer header array 460. If a previous index 380 is null then the physical memory buffer 90 with a state flag 400 is at the head of the queue for that particular state. Correspondingly, if the next index 390 is null then the physical memory buffer with a state flag 400 is at the tail of the queue for that particular state.

The reference counter 410 field indicates whether a physical memory buffer 90 is in use by a process. A reference counter 410 greater than 0 indicates a physical memory buffer 90 is in use by a process 130 and in the mapped state 170. A reference counter 410 equal to 0 indicates that a physical memory buffer 90 is not currently in use and will reside in either the mapped state 170 or the transition state 180. A reference counter 410 less than 0 (−1) indicates a physical memory buffer 90 is in the extended state 190. The value of the reference counter 410 may permissibly range from −1 to N, where N is 0 or positive.

The reference bit 420 field assumes a value of 0 (unset) or 1 (set). Initially, all reference bits 420 associated with all physical memory buffers 90 are unset. Each time a map routine 200 executes against a physical memory buffer 90 the reference bit 420 is set. The reference bit 420 is only unset when the victim selection routine 210 is executing to acquire additional physical memory buffers 90 with valid in-process addressable addresses 40 currently residing in the mapped state 170 with a reference counter 410 equal to 0. This victim selection routine is described in detail with FIG. 13 below.

The lock bit 430 field is used when a physical memory buffer 90 is being modified in some way. For example, the lock bit 430 is set (a value of 1) when a memory buffer 90 is changing states. This provides for data integrity during an operation in the physical memory buffer 90.

Finally, a total count 440 field is used but is only checked or updated for physical memory buffers 90 in the transition state 180 and only for the physical memory buffer 90 at the head of that queue. This total counter 440 is incremented when transition state's 180 memory buffers 90 are added to the queue, and decremented when transition state 180 physical memory buffers 90 are removed from the queue. The total counter 440 is also compared to a high watermark (described above) and triggers certain operations contained in the victim selection routine 210 (described below with FIG. 13).

Figure 9:
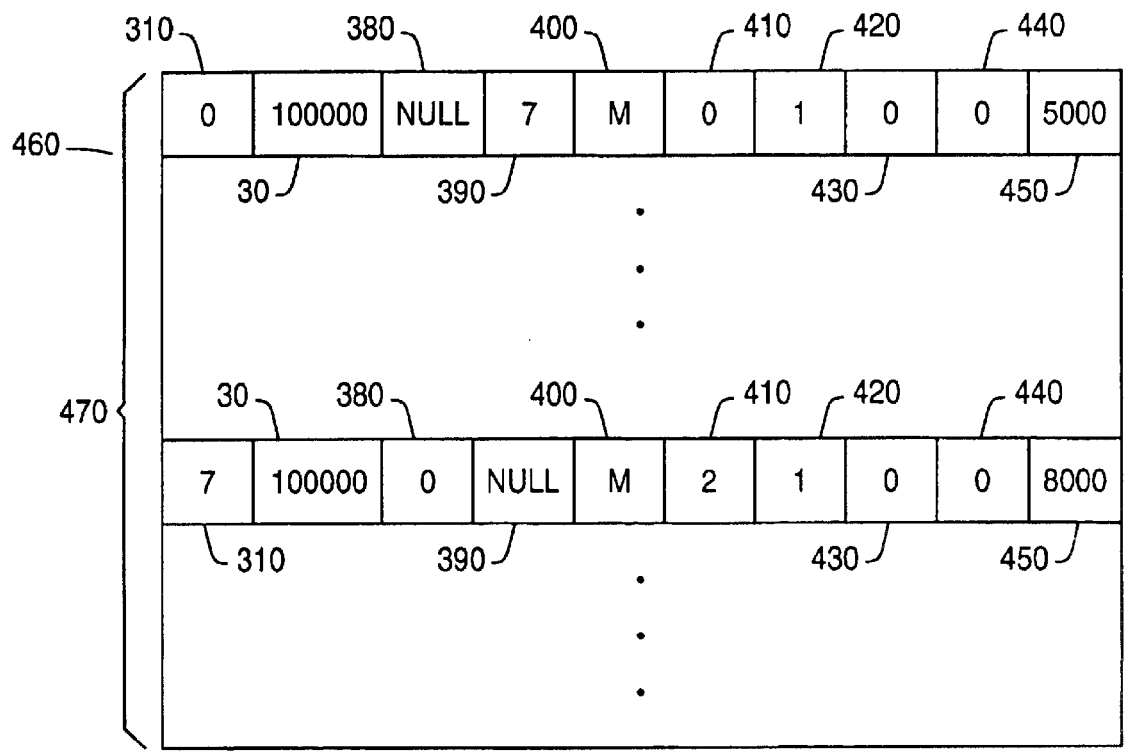
FIG. 9 is a diagram illustrating a composite data structure in accordance with the present invention.

FIG. 9 is a diagram illustrating a preferred composite data structure in accordance with the present invention. This preferred composite data structure is a one dimensional array referred to herein as a memory buffer header array 460. Each element of the memory buffer header array 460 is a memory buffer header 370 described above with FIG. 8. All of the elements in the memory buffer header array 460 comprise the rows of the memory buffer headers 470. FIG. 9 also illustrates an example of two physical memory buffers 90 which are accessible via the physical memory buffer address pointer 450.

Both of these physical memory buffers 90 are in the mapped state 170 since their respective state flags 400 are set to a value of "M." In this simplistic example, the mapped state 170 currently has only two physical memory buffers 90 in its queue. This is determined by locating the physical memory buffer 90 in the mapped state 170 with a previous index value 380 of null. In this example the physical memory buffer 90 identified by the index 310 at location 0 meets this criterion and is therefore the head of the mapped state 170 queue. The head of the queue of the mapped state 170 can be traversed by following the next index 390 field. In the example this contains a value of 7 for the head of the mapped state 170 queue identified at index 310 location 0. Moving within the memory buffer header array 460 to index 310 location 7 we find the tail of the mapped state 170 queue. This is determined by locating a null value in the next index 390 field, we can also traverse the queue from the tail to the head by using the 0 value contained in the previous index 380 field, which in our example returns us to the head of the queue.

Figure 10:
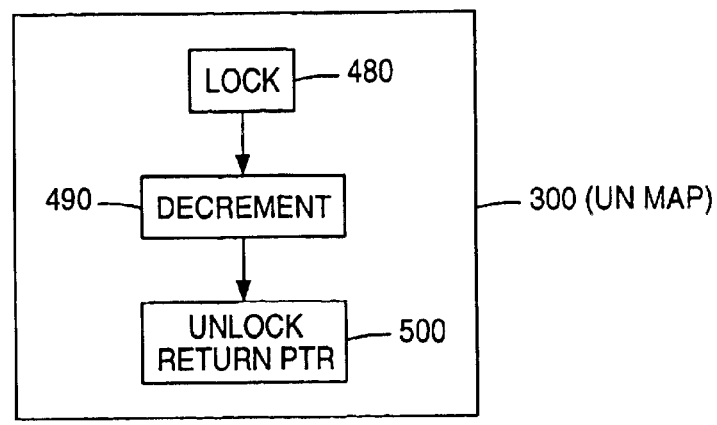
FIG. 10 is a flow diagram illustrating the unmap routine in accordance with the present invention.

FIG. 10 is a flow diagram illustrating the unmap routine 300 in accordance with the present invention. The unmap routine 300 is contained in the user library module 150. The first step in the unmap routine 300 is to set the lock bit 430 in the memory buffer header 370 of the memory buffer 90 being unmapped, identified in step 480 of FIG. 10. The process 130 calls the unmap routine 300 with the index 310 to identify the physical memory buffer 90 which is being released by the process 130. The process 130 acquired all the indices 310 at initialization for all physical memory buffers 90 and uses these indices 310 prior to mapping or unmapping a physical memory buffer 90.

Next, in step 490 the reference counter 410 associated with the physical memory buffer 90 is decremented but never below a value of 0. (Which presumably could not happen, unless the process 130 attempted to call the unmap routine 300 with a physical memory buffer 90 which was currently not in use.) In step 500, the physical memory buffer 90 has its lock bit 430 unset and a pointer to the physical memory buffer address 450 is returned to the process 130. Notice, the unmap routine 300 is only called on memory buffers 90 currently residing in the mapped state 170.

Figure 11:
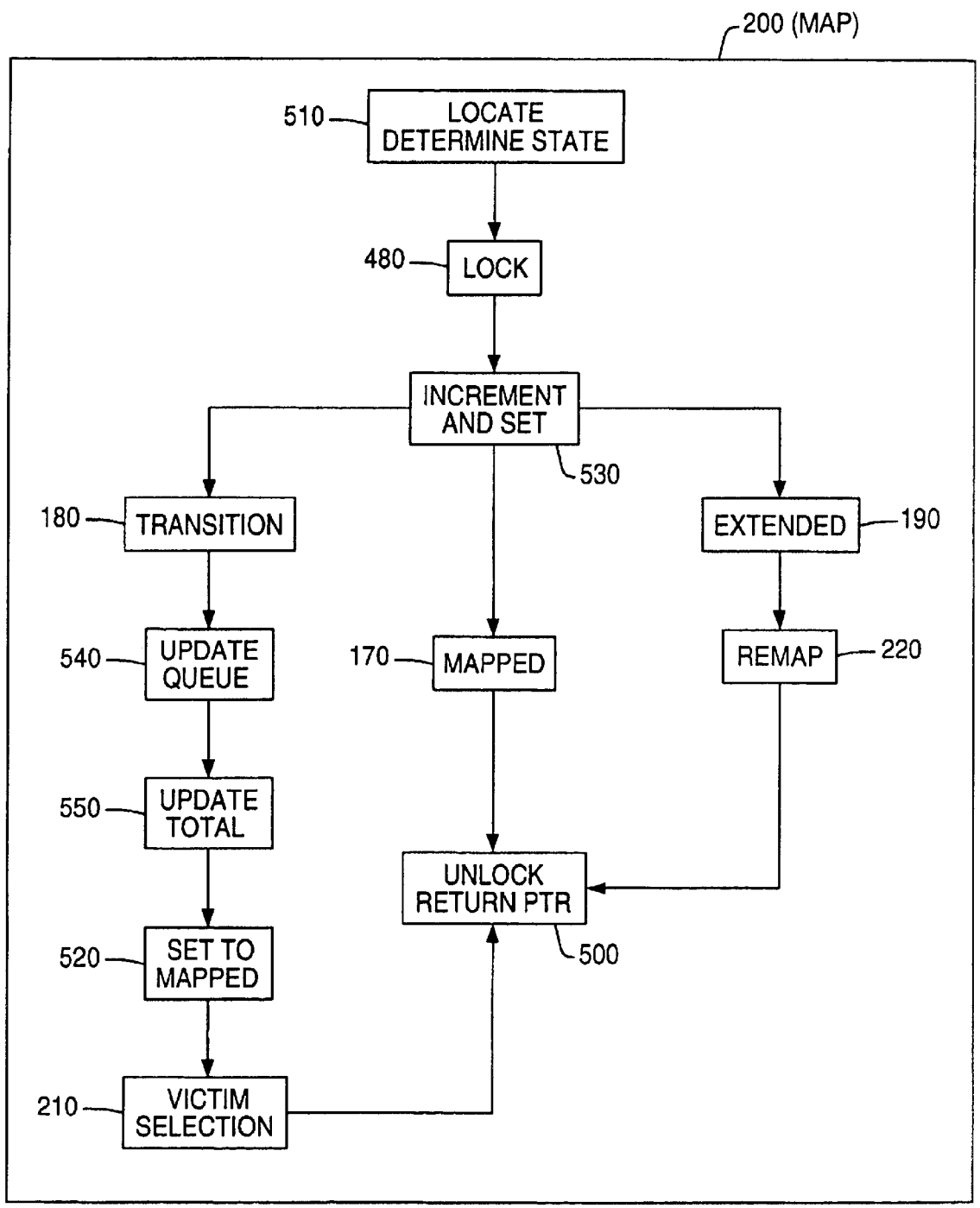
FIG. 11 is a flow diagram illustrating the map routine in accordance with the present invention.

FIG. 11 is a flow diagram illustrating the map routine 200 in accordance with the present invention. The map routine 200 is initiated by a call from the process 130. The map routine 200 resides in the user library module 150. The process 130 passes to the map routine 200 an index 310 which is used to directly access the memory buffer header array 460 in step 510. In step 510 the state flag 400 of the physical memory buffer 90 is also determined. Once the appropriate memory buffer header 370 and state are determined the physical memory buffer 90 is locked in step 480 by setting the lock bit 430. In step 530 the reference counter 410 associated with the memory buffer header 370 for this particular memory buffer 90 is incremented by 1 and the reference bit 420 is set.

Next, the map routine 200 selects a path of execution based upon the state flag 400 value of the physical memory buffer 90. If the physical memory buffer 90 is associated with the transition state 180 then the memory buffer header 370 is extracted from the transition state 180 queue which is logically contained in the memory buffer header array 460. The memory buffer header 370 which preceded the extracted memory buffer header 370 (if any) and the memory buffer header 370 which succeeded the extracted memory buffer header 370 (if any) have their concomitant previous indices 380 and next indices 390 values updated to no longer reference the extracted memory buffer header 370. Updating the queue indices 390 is shown in step 540.

The memory buffer header 370 occupying the head of the transition state 180 queue has its associated total count 440 decremented by 1 shown in step 550. If the extracted memory buffer header 370 was in fact the head of the queue, then the total count 440 value is decremented by 1 and copied to the new memory buffer header 370 representing the new head of the queue. Next, since the total count 440 associated with the number of physical memory buffers 90 contained in the transition state 180 queue was decremented the victim selection routine 210 is called to determine if the total count 440 has fallen below the high watermark. The victim selection routine 210 is discussed in detail below with FIG. 13.

If the originally requested physical memory buffer 90 which was requested to be mapped was already in the mapped state 170 then no additional processing need be performed. If the requested physical memory buffer 90 was in the extended state 190 then the remap routine 220 is called. The remap routine 220 is discussed in detail with FIG. 12 below. Finally, the map routine 200 terminates by unlocking the physical memory buffer 90 and returning to the process 130 a physical memory buffer address pointer 450.

Figure 12:
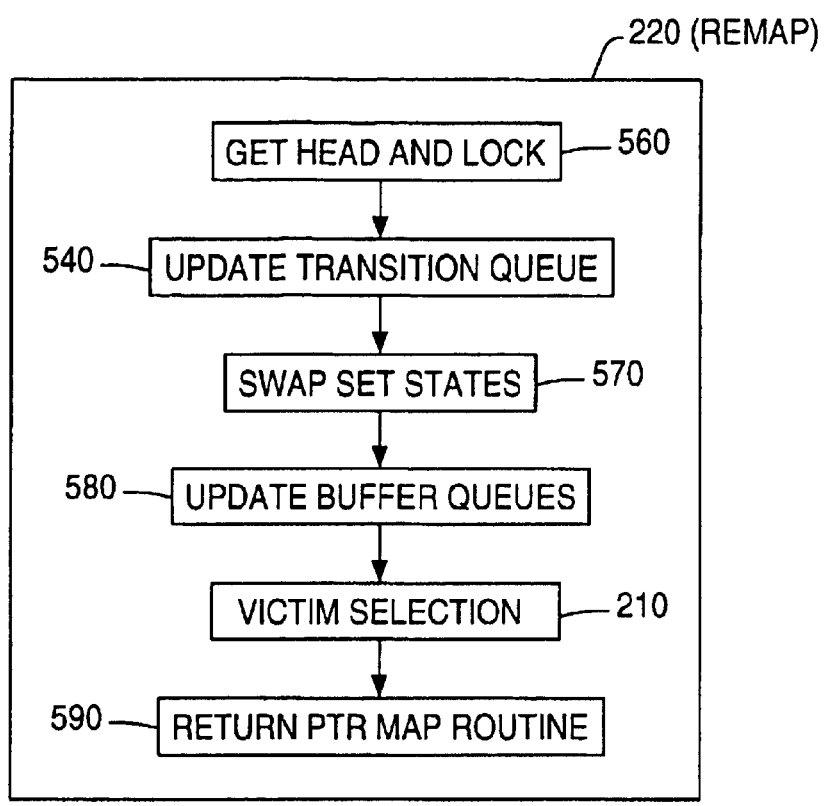
FIG. 12 is a flow diagram illustrating the remap routine in accordance with the present invention.

FIG. 12 is a flow diagram illustrating the remap routine 220 in accordance with the present invention. In step 560 an additional physical memory buffer 90 is acquired by extracting the physical memory buffer 90 occupying the head of the transition state 180 queue and its lock bit 430 is set. The physical memory buffer 90 identified by the extracted physical memory buffer's 90 next index 390 field will now be the head of the transition state 180 queue. The new head of the queue will assume the a total count 440 value of the extracted physical memory buffer 90 less 1. To reflect a deletion of a buffer from the queue. The new head of the queue will have its previous index 380 set to null. Updating the transition state 180 queue is identified in step 540.

The virtual address 30 of the physical memory buffer 90 originally requested to be mapped will be swapped with the virtual address 30 of the extracted transition state 180 physical memory buffer 90, shown in step 570. This will give the prospective mapped physical memory buffer 90 a virtual address 30 which is an in-process addressable address 40. The extracted physical memory buffer 90 has its state flag 400 set to extended. The prospective mapped physical memory buffer 90 has its state flag 400 set to mapped. This will give the mapped physical memory buffer 90 an in-process addressable address 40. In step 580 all reference counters 410 are appropriately set, the extracted physical memory buffer 90 receiving a value of −1 and the mapped physical memory buffer 90 receiving a value of 1.

Also, in step 580 the previous indices 380 and the next indices 390 associated with these physical memory buffers 90 are updated accordingly so that their logical ordering within the memory buffer header array 460 is appropriately maintained. Additionally, the newly extended physical memory buffer 90 will unset its lock bit 430 in this step. Since the transition state 180 queue has been altered (reflected in a changed value of its total count 440), the victim selection routine 210 is called.

Finally, the physical memory buffer address pointer 450 associated with the newly mapped physical memory buffer 90 is returned to the map routine 200 which will then unlock the physical memory buffer 90 by unsetting its lock bit 430 and passing it along to the process 130.

Figure 13:
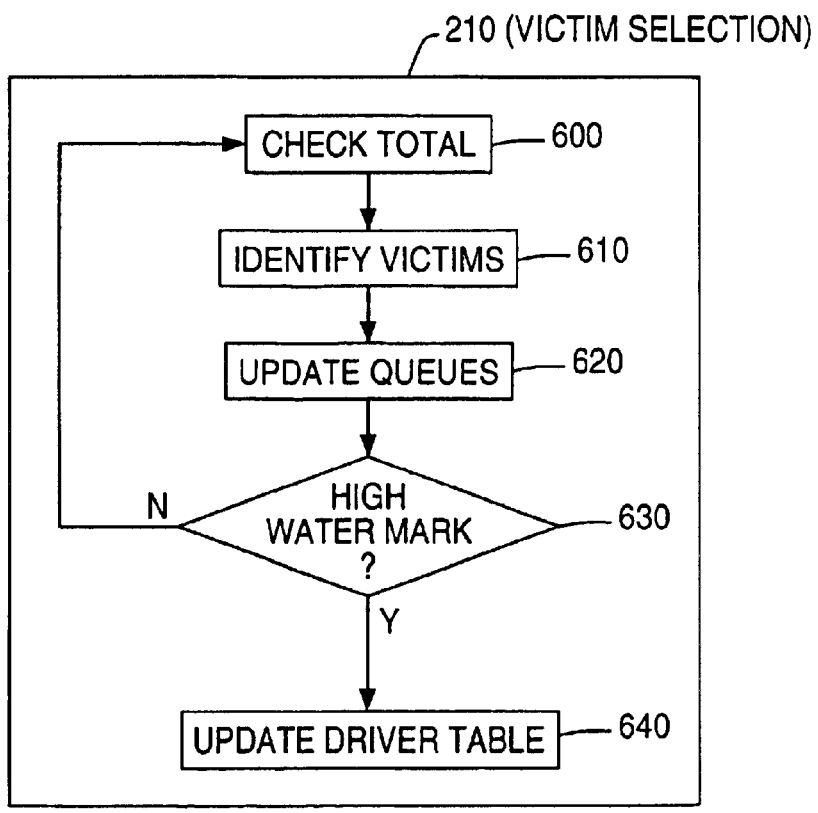
FIG. 13 is a flow diagram illustrating the victim selection routine in accordance with the present invention.

FIG. 13 is a flow diagram illustrating the victim selection routine 210 in accordance with the present invention. The victim selection routine 210 is called whenever the total count 440 is decremented. The total count 440 is maintained with the head of the transition state 180 queue. The first step 600 checks the total count 440 to ensure that it is greater than or equal to the high watermark value. (The high watermark value was discussed herein above.) If this condition is met the victim selection routine 210 terminates as no additional processing will be necessary.

If the total count 440 is less than the high watermark then the processing proceeds by traversing the memory buffer header array 460 looking for physical memory buffers 90 which are good victims to move to the tail of the transition state 180. Victims are identified (step 610) by only evaluating the logical queue of mapped physical memory buffers 90 contained in the memory buffer header array 460, and only those physical memory buffers 90 with a reference counter 410 equal to 0. Indicating the process 130 is not using this particular physical memory buffer 90. The identification of a victim will then proceed preferably using an approximation of the least recently used algorithm by using a standard global clock hand approach known to those skilled in the art.

In this approach two clock hand variables are started at the same time and set at a predetermined distance apart from each other (preferably ½ the size of the logical mapped physical memory buffer 90 queue). The first clock hand will unset the reference bit 420 of the physical memory buffer 90. Should the process 130 during the intervening interval between the first and second clock hand use this physical memory buffer 90 in any way, the reference bit 420 is set. When the second clock hand arrives at this physical memory buffer 90, if the reference bit 420 is still unset then the physical memory buffer 90 is acquired to populate the transition state 180 queue to the high watermark value.

Once a victim is identified, it is immediately locked and removed from the mapped state 170 queue. The victim is switched to the transition state 180 and placed at the tail of the transition state 180 queue. All appropriate updates to the memory buffer headers 370 occur in step 620 to reflect the modified queues. Processing then continues until all the transition state 180 queue reaches the high watermark.

In step 640 the driver table 650 is updated. The driver table 650 and its operation is described in detail below with FIG. 14. Finally, the victim selection routine 210 terminates.

Figure 14:
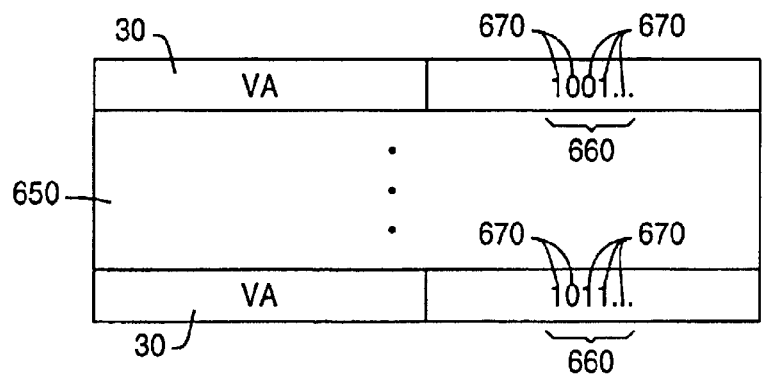
FIG. 14 is a diagram illustrating a data control structure in accordance with the present invention.

FIG. 14 is a diagram illustrating a data control structure in accordance with the present invention. The data control structure identified by FIG. 14 is preferably referred to as a driver table 650. This structure permits interaction between the driver module 160 and the transition state's 180 physical memory buffers 90 which are populated by the victim selection routine 210 described above with FIG. 13. This structure is preferably 2 addressable words in length. (Although additional words will be used when required if the number of processors 690 running in the environment exceeds the number of bits contained in a single addressable word.) Additionally, the optimal number of entries in the driver table 650 is determined as previously discussed above.

The first addressable word of the driver table 650 contains a virtual memory address 30. The second addressable word is collective referred to as a flag field 660 containing a number of bits 670. The number of these bits 670 will be the size of the addressable word. Each bit identifies whether a particular processor 690 running in the network 680 has flushed the virtual address 30 (represented by the value of the first addressable word of the driver table 650) from the particular processor's 690 virtual-to-physical memory cache 710. An unset bit 670 indicates no flushing has occurred while a set bit 670 indicates a flush has already been performed. Not all the bits 670 will be used as each bit 670 represents a single unique processor 690 running on the network 680.

Figure 15:
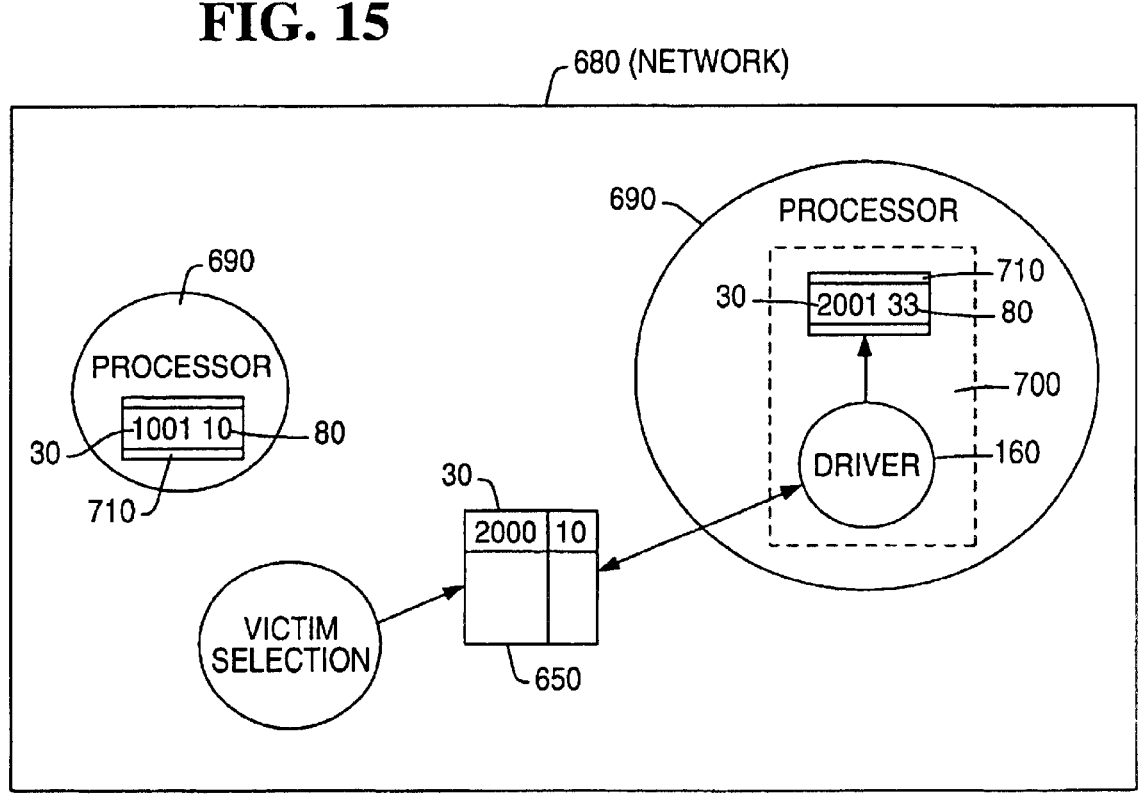
FIG. 15 is a flow diagram illustrating the operation of the driver module in accordance with the present invention.

FIG. 15 is a flow diagram illustrating the operation of the driver module 160 in accordance with the present invention. The driver module 160 is said to achieve a context 700 when it is executing on a particular processor 690. The driver module 160 while in a context 700 and doing work will read the driver table 650 and rapidly identify those virtual memory addresses 30 which require flushing on the processor 690 in context 700, if the bit 670 representative of the processor 690 is unset. (Recall, that the victim selection routine 210 continues to populate the driver table 650 during the course of its execution). The driver module 160 then identifies the virtual memory addresses 30 which need to be flushed from the virtual-to-physical memory cache 710 of the processor 690 in context 700 and performs the necessary flush.

As will be readily apparent to those skilled in the art, the foregoing description permits optimal management of processes addressable space when very large memory is required by the process. Further, performance in a multi processing environment is enhanced with the disclosed method of flushing the processor memory caches (e.g, TLBs).

The foregoing description of preferred embodiments of the invention has been presented for purposes of illustration and description. It is not intended to be exhaustive or to limit the invention to the precise form disclosed, and obviously many modifications and variations are possible in light of the above teachings. For example, different languages such as C++, Java, and others could have been used, and the architectural design may have been object oriented as opposed to structured.

Furthermore, different data structures such as binary trees or stacks could have been employed as opposed to queues and link lists. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A method for providing additional memory located outside the addressable region of a process having executable instructions, comprising:

managing a process capable of accessing memory for a number of the out-of-process addressable addresses through a remapping of a number of in-process addressable addresses; and creating in advance of a request from the process a plurality of available in-process addressable addresses from the out-of-process addressable addresses using state transitions.

2. The method in claim 1, wherein managing further includes:

creating a plurality of data structures;

assigning a separate one of the data structures for each of the out-of-process addressable addresses and for each of the in-process addressable addresses;

creating a composite data structure linking the data structures; and interfacing the out-of-process addressable addresses and the in-process addressable addresses through the composite data structure.

3. The method in claim 2 further comprising, defining the available in-process addressable addresses to comprise, a number of the in-process addressable addresses which are not being used by the process.

4. The method of claim 3 further comprising, managing the data structures through the state transitions.

5. The method of claim 4 further comprising, defining the state transitions to include states of: a mapped state; an extended state; and a transition state.

6. The method of claim 5 further comprising, using the available in-process addressable addresses within the states.

7. The method of claim 5 further comprising, using the data structures with the out-of-process addressable addresses within the extended state.

8. The method of claim 2 further comprising using the composite data structure to represent a logical ordering for the data structures associated with the available in-process addressable addresses.

9. The method of claim 8 further comprising, using the logical ordering with a modified version of the least recently used algorithm.

10. A method for flushing a memory cache associated with virtual memory remapping in a multi processing environment having executable instructions, comprising:

permitting a plurality of processors to run on a network, each processor having a virtual-to-physical memory cache including a plurality of virtual memory addresses mapped to a plurality of physical memory addresses;

permitting a process to run on the processors, the process having a number of the virtual memory addresses to access the physical memory addresses of the memory;

interfacing the process with the virtual-to-physical memory caches for each of the processors;

identifying when the process has a context on a particular one of the processors; and flushing from the virtual-to-physical memory cache of the particular processor with the context, a number of the virtual memory addresses being used by the process, which have been previously modified as soon as the context is identified.

11. The method in claim 10, wherein interfacing further includes:

defining a data control structure including a unique flushing flag for each of the virtual memory addresses and a plurality of bit fields within the unique flushing flag, which identifies a separate one of the processors; and granting the process read and write access to the data control structure.

12. The method in claim 10, wherein permitting the plurality of processors to run on the network further includes using a symmetric multi-processing network environment.

13. The method in claim 11 further comprising, modifying the process to include: an application having access to a user library module, the user library module having access to a driver module and read and write access to the data control structure, and the driver module having read and write access to the data control structure.

14. A system for providing additional memory located outside the addressable region of a process and for flushing memory cache, comprising:

a memory accessed through a plurality of out-of-process addressable addresses and a plurality of in-process addressable addresses;

a plurality of processors, each processor having a virtual-to-physical memory cache;

a process having access to the memory through the in-process addressable addresses;

a remap routine that remaps the in-process addressable addresses of the process to get access to the memory associated with the out-of-process addressable addresses; and a flushing routine that flushes a number of the in-process addressable addresses and a number of the out-of-process addressable addresses on a number of the virtual-to-physical memory caches of the processors as soon as the process has a context on one of the processors.

15. The system of claim 14, further comprising:

a plurality of data structures, wherein a separate one of the data structures are assigned for each of the out-of-process addressable addresses and for each of the in-process addressable addresses;

a composite data structure linking the data structures, wherein the out-of-process addressable addresses and the in-process addressable addresses are interfaced through the composite data structure;

a data control structure including a unique flushing flag for each of a number of the in-process addressable addresses and for each of a number of the out-of-process addressable addresses; and a plurality of bit fields within the unique flushing flag identifying a separate one of the processors, wherein the process is interfaced with the virtual-to-physical memory cache for each of the processors utilizing the data control structure.

16. The system of claim 15, further comprising, data structure manager operable to manage a number of the data structures using a plurality of state transitions.

17. The system in claim 16, wherein the state transitions include states of a mapped state; an extended state; and a transition state.

18. The system in claim 17, wherein a plurality of available in-process addressable addresses are used within the states.

19. The system in claim 17, wherein the extended state uses a plurality of available out-of-process addressable addresses.

20. The system of claim 17, wherein the composite data structure uses a logical ordering for the data structures associated with a number of the available in-process addressable addresses.

21. The system of 20, wherein the logical ordering is used as an ordering for a modified version of the least recently used algorithm.

22. A system for providing additional memory located outside the addressable region of a process and for flushing memory cache, comprising:

a memory accessible through a plurality of out-of-process addressable addresses and a plurality of in-process addressable addresses;

a plurality of processors, each processor having a virtual-to-physical memory cache;

a processing having access to the memory through the in-process addressable addresses;

a remap routine to remap the in-process addressable addresses of the process in order to gain access to the memory associated with the out-of-process addressable addresses; and a flushing routine set to flush a number of the in-process addressable addresses and a number of the out-of-process addressable addresses on a number of the virtual-to-physical memory caches of the processors as soon as the process has a context on one of the processors.

23. The system of claim 22, further comprising:

a manager to manage a number of the in-process addressable addresses and a number of the out-of-process addressable addresses using a plurality of state transitions.

24. The system of claim 22, further comprising:

an interface routine to interface the process, a number of the in-process addressable addresses, a number of the out-of-process addressable addresses, and a number of the virtual-to-physical memory caches with a data control structure.

* * * * *